Patented Nov. 1, 1932

1,885,187

UNITED STATES PATENT OFFICE

CHARLES DE ROHDEN, OF BALTIMORE, MARYLAND, ASSIGNOR, BY MESNE ASSIGNMENTS, TO KREBS PIGMENT AND COLOR CORPORATION, OF NEWARK, NEW JERSEY, A CORPORATION OF DELAWARE

PRODUCTION OF TITANIUM PIGMENTS

No Drawing.   Application filed January 17, 1928.  Serial No. 247,465.

My invention pertains to the production of titanium pigments, and relates more specifically to a process for producing a pure white pigment from titanium dioxide. Briefly, my invention relates to a process of purifying titanium dioxide by treating it with a dilute acid in the presence of a reducing agent.

As disclosed in my co-pending application, Serial No. 247,464, filed Jan. 17, 1928, granted Feb. 23, 1932 as Patent No. 1,846,188, I have discovered that by digesting titanium dioxide in a dilute acid, a whiter pigment is produced after calcination. This favorable result is probably due to some modification in the particle structure. In said co-pending application I have also disclosed the fact that such an acid digestion treatment is aided by the presence of a trace of oxidizing agent.

I have now discovered that if titanium dioxide is treated with dilute acid in the presence of a reducing agent, the same favorable whitening effect, probably due to a modification of particle structure, is obtained; and at the same time a further favorable effect is produced in that the traces of iron present in the $TiO_2$ are removed.

In practice, titanium dioxide is ordinarily prepared from a solution of titanium sulfate by hydrolysis. A suitable hydrolysis process is described in Blumenfeld's Patent 1,504,672. Industrially prepared titanium sulfate solutions usually contain more or less iron salts which occur either as acid impurities or as the result of the treatment of iron-containing titanium ores. The presence in a titanium sulfate solution of ferrous iron in amounts up to 25 grams per liter does not interfere with the production of a good quality of titanium dioxide by hydrolysis. After the hydrolysis process the $TiO_2$ is recovered by filtration and washing, and the iron content is seldom much in excess of 0.1% of the $TiO_2$.

While $TiO_2$ of this degree of purity will produce a white pigment on calcination, I have found that a still better result is obtained from purer material. By means of my novel process, it is possible to remove traces of iron from titanium dioxide and at the same time to improve the particle structure, with the result that a pigment of superior whiteness is produced by calcination.

My process, while particularly useful for the treatment of titanium dioxide produced by the hydrolysis of sulfate solutions, is equally applicable to the treatment of $TiO_2$ produced by other methods—for example, from titanium tetrachloride. It is also particularly useful for the treatment of titanium dioxide containing larger amounts of iron than is usual. Such materials are of course produced occasionally in the operation of industrial processes.

In practicing invention, I suspend $TiO_2$ in water containing from 1–5% of a dilute acid. While I prefer to employ hydrochloric acid or sulfuric acid, any mineral acid except nitric acid may be used. Nitric acid is useful in the acid digestion—per se—but naturally cannot be used in combination with a reducing agent. The exact concentration of suspended $TiO_2$, is immaterial to the process. I have found it convenient and economical to prepare suspensions containing about 300 grams per liter.

To the suspension of $TiO_2$ in dilute acid, a small amount of reducing agent is added. For example, hydrogen sulfide gas may be dissolved in the aqueous mixture or a soluble thiosulfate or sulfide salt may be used.

While I prefer to conduct the digestion process at an elevated temperature, a favorable result is also obtained by merely agitating the $TiO_2$ in the mixture at room temperature.

The effect of the treatment is twofold. The combination of acid and reducing agent purifies the $TiO_2$ by removing iron, and, in addition, the acid itself has some effect on the particle structure which results in a whiter pigment after calcination.

When the treatment is complete, the $TiO_2$ is recovered by filtration and is washed, after which it is dried and calcined at 950–1000° C. for from fifteen to thirty minutes. The resultant product is a white pigment that is ready for use, though it is usually necessary to pulverize it to break up agglomerates formed during calcination.

Now, having generally described my invention, I shall give the following specific examples of its use.

Example I

Titanium dioxide obtained by the hydrolysis of titanium sulfate solution is filtered, washed, and is suspended in water at a concentration of about 300 grams per liter. About 20 cc. of hydrochloric acid (22° Bé.) per liter is then added. The mixture is agitated and hydrogen sulfide gas is passed in. It is not necessary to saturate the solution with gas and a good result is achieved if sufficient gas is present to make the solution notably odorous.

If the treatment is to be made at room temperature, it should be continued for about 24 hours, after which the $TiO_2$ is removed by filtration, and is washed, dried, and calcined. If the treatment is conducted at elevated temperatures, that is at 70–100° C., one or two hours will suffice.

Example II

In the process described in Example I, sulfuric acid, phosphoric acid, or a different halogen acid may be employed with the same result.

Example III

In the process described in Example I or II, a different reducing agent may be employed. For example, there may be added, to the suspension of $TiO_2$ in dilute acid, a soluble salt of a reducing acid such as thiosulfuric acid or hydrogen sulfide acid. Specifically, sodium thiosulfate or sodium sulfide, or the equivalent potassium salts may be added in the proportion of about 5–10 grams per liter. These substances react with the acid present, and the salts thus produced are eliminated during the filtering and washing operations subsequent to the acid digestion.

Example IV

In the process described in Examples I, II and III, I may employ a titanous salt as the reducing agent. For example, I may employ dilute sulfuric acid for the digestion process and may add from 5–10 grams of titanous sulfate per liter to the mixture. Other titanous salts may be used.

Example V

In the process described in the previous examples, nascent hydrogen may be used as the reducing agent. The hydrogen may conveniently be produced by adding some scrap metal to the acid solution. Hydrogen may also be generated by electrolysis of the solution.

Example VI

The process described in the previous examples may be conducted in an autoclave at elevated pressure and temperature. Such a process has an advantage in rapidity, since temperatures in excess of the normal boiling point of the mixture may be employed. The elevated pressure is particularly advantageous when reducing agents are used that consist of or form gaseous products.

When dilute hydrochloric acid is used in the process care must be taken that a trace of sulfuric acid or some other polybasic acid is present. As disclosed in Blumenfeld's Patent 1,504,673, pure $TiO_2$ produced by hydrolysis and subsequently treated to remove adsorbed sulfuric acid is peptized by hydrochloric acid to form a colloidal dispersion. The formation of such a dispersion would interfere with subsequent filtration. The $TiO_2$ precipitated by hydrolysis, unless carefully treated to remove the adsorbed sulfuric acid, will not be peptized by hydrochloric acid. Even very pure moist $TiO_2$ obtained by hydrolysis will not be peptized by hydrochloric acid containing sodium thiosulfate. In any event, the presence of a trace of a polybasic acid or a salt of polybasic acid in the hydrochloric acid used for my process will inhibit peptization.

I claim:

1. A process for producing a white pigment which comprises digesting hydrolytically precipitated titanium dioxide with dilute hydrochloric acid in the presence of a reducing agent.

2. A process for producing a white pigment which comprises digesting hydrolytically precipitated titanium dioxide with dilute hydrochloric acid in the presence of the sulfide radicle.

CHARLES DE ROHDEN.